United States Patent
Fudulea

(10) Patent No.: US 10,900,871 B2
(45) Date of Patent: *Jan. 26, 2021

(54) METHOD FOR ESTIMATING THE RELIABILITY OF MEASUREMENTS BY WHEEL SENSORS OF A VEHICLE AND SYSTEM FOR ITS APPLICATION

(71) Applicants: CONTINENTAL AUTOMOTIVE FRANCE, Toulouse (FR); CONTINENTAL AUTOMOTIVE GmbH, Hannover (DE)

(72) Inventor: Olivier Fudulea, Toulouse (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 303 days.

This patent is subject to a terminal disclaimer.

(21) Appl. No.: 16/018,443

(22) Filed: Jun. 26, 2018

(65) Prior Publication Data

US 2018/0299351 A1    Oct. 18, 2018

Related U.S. Application Data

(63) Continuation of application No. 14/968,663, filed on Dec. 14, 2015, now Pat. No. 10,132,719.

(30) Foreign Application Priority Data

Dec. 17, 2014    (FR) ..................... 14 62580

(51) Int. Cl.
*G01M 17/013*    (2006.01)
*B60C 23/04*    (2006.01)
(Continued)

(52) U.S. Cl.
CPC ....... *G01M 17/013* (2013.01); *B60C 23/0477* (2013.01); *B60C 23/0481* (2013.01);
(Continued)

(58) Field of Classification Search
None
See application file for complete search history.

(56) References Cited

U.S. PATENT DOCUMENTS

| 4,600,215 A | 7/1986 | Kuroki et al. |
| 4,750,584 A | 6/1988 | Tanaka et al. |

(Continued)

FOREIGN PATENT DOCUMENTS

| DE | 10 2004 064 002 A1 | 5/2007 |
| DE | 10 2004 037 875 B4 | 5/2008 |

(Continued)

OTHER PUBLICATIONS

French Search Report, dated Aug. 4, 2015, from corresponding French Application.

*Primary Examiner* — Nicholas K Wiltey
(74) *Attorney, Agent, or Firm* — Nixon & Vanderhye

(57) ABSTRACT

A method and system for evaluating the reliability of data supplied by multi-function WFC sensors of tires of wheels of a vehicle for targeted applications, on the basis of the irregularities of the road, which use displacement data sent from the road handling adaptation equipment of the vehicle, enabling the variations in the road condition to be reflected. The system includes equipment for monitoring the wheel displacement data for adapting it to the variations of profile of the road on which it is traveling, in order to maintain a stable body position. The monitoring equipment is linked to the WFC sensors via a central processing unit which is capable of correlating data supplied by the WFC sensors and values of wheel displacement data supplied by the monitor-
(Continued)

ing equipment for the purpose of weighting the values of at least one parameter obtained from the data delivered by the WFC sensors.

5 Claims, 7 Drawing Sheets

(51) Int. Cl.
  *B60C 23/06* (2006.01)
  *B60T 8/171* (2006.01)
  *G07C 5/08* (2006.01)
(52) U.S. Cl.
  CPC ............ *B60C 23/067* (2013.01); *B60T 8/171* (2013.01); *G07C 5/0808* (2013.01)

(56) References Cited

U.S. PATENT DOCUMENTS

| | | | |
|---|---|---|---|
| 5,334,986 | A | 8/1994 | Fernhout |
| 5,808,190 | A | 9/1998 | Ernst |
| 6,112,587 | A | 9/2000 | Oldenettel |
| 8,402,821 | B2 | 3/2013 | Fink |
| 10,132,719 | B2 * | 11/2018 | Fudulea ............... B60T 8/171 |
| 10,222,455 | B1 * | 3/2019 | Stieff ............... G01S 7/4808 |
| 2003/0050743 | A1 | 3/2003 | Caretta |
| 2004/0225423 | A1 | 11/2004 | Carlson |
| 2005/0086000 | A1 | 4/2005 | Tsuchiya |
| 2006/0028326 | A1 | 2/2006 | Haas |
| 2009/0080703 | A1 | 3/2009 | Hammerschmidt |
| 2009/0205414 | A1 | 8/2009 | Vassilieff et al. |
| 2010/0083747 | A1 | 4/2010 | Fink et al. |
| 2010/0101692 | A1 | 4/2010 | Fogal |
| 2010/0198527 | A1 | 8/2010 | Gouriet |
| 2010/0318671 | A1 | 12/2010 | Lee et al. |
| 2011/0231051 | A1 | 9/2011 | Gerdin |
| 2012/0259507 | A1 | 10/2012 | Fink |
| 2013/0180324 | A1 | 7/2013 | Sota |
| 2013/0342362 | A1 * | 12/2013 | Martin ............... B60T 13/665 340/870.16 |
| 2014/0001717 | A1 | 1/2014 | Giovanardi |
| 2014/0019003 | A1 | 1/2014 | Guinart et al. |
| 2014/0070935 | A1 | 3/2014 | Wang |
| 2014/0260585 | A1 | 9/2014 | Singh |
| 2015/0191056 | A1 | 7/2015 | Mori et al. |
| 2015/0233711 | A1 | 8/2015 | Guinart |
| 2016/0272228 | A1 * | 9/2016 | LeFebvre ............... H04L 67/12 |
| 2017/0066298 | A1 | 3/2017 | Allgayer |
| 2017/0124784 | A1 | 5/2017 | Wittmann |

FOREIGN PATENT DOCUMENTS

| | | |
|---|---|---|
| EP | 0 895 879 | 2/1999 |
| EP | 1 867 498 | 12/2007 |
| EP | 2 090 062 A2 | 8/2009 |
| EP | 2 090 862 A1 | 8/2009 |
| EP | 2 774 784 | 9/2014 |
| FR | 2 944 231 A1 | 10/2010 |
| FR | 2 974 033 A1 | 10/2012 |
| JP | 2007-131098 A | 5/2007 |
| WO | 2010/116095 | 10/2010 |
| WO | 2012/162241 | 11/2012 |
| WO | 2014/024436 | 2/2014 |
| WO | 2014/044355 A1 | 3/2014 |

* cited by examiner

METHOD FOR ESTIMATING THE RELIABILITY OF MEASUREMENTS BY WHEEL SENSORS OF A VEHICLE AND SYSTEM FOR ITS APPLICATION

FIELD OF THE INVENTION

The invention relates to a method for estimating the reliability of measurements supplied by the multi-function wheel sensors of a vehicle, and to a system for the application of this method.

BACKGROUND OF THE INVENTION

The data supplied by wheel sensors are employed in targeted applications using the measurements supplied by these sensors, notably:
- wheel location, for the purpose of monitoring the pressure of the tire corresponding to each located wheel,
- detection of overload and wear of tires,
- automatic training of the sensors, or
- monitoring the positions of the sensors themselves.

At the present time, vehicle wheels usually incorporate multi-function sensors known as WFCs (an acronym for "Wheel Fitted Component" in the English terminology) in modules which may either be fixed to the wheel rim—in which case the modules are known as wheel units or WUs (an acronym for "Wheel Unit" in the English terminology)—or fixed directly to the inner face of the tire, in which case the modules are known as TMs (an acronym for "Tire Module" in the English terminology).

These WFC sensors periodically supply measurements made by pressure, temperature and/or acceleration sensors to a microprocessor integrated in a central processing unit, via a CAN bus or transceivers fitted with antennas. The set of means employed (sensors, central unit, and communication network using cables or transceivers) forms a system for monitoring the pressure of the tires, conventionally known as a TPMS system (an acronym for "Tire Pressure Monitoring System" in the English terminology).

The digital data supplied by the WFC sensors to the central processing unit indicate the successive levels of variation. On the basis of these values, the central processing unit calculates, after filtering and sampling, pressure and temperature signals which are transmitted to the on-board computer of the vehicle. The acceleration data are used, in particular, in the aforementioned targeted applications, for supplying the values of the essential parameter for these applications during the periodic transmission of the sensors, namely the angular location of the sensors in the wheels and/or the length of the footprint of the tires on the ground.

The basic parameter setting for some of the targeted applications may make use of data supplied by other methods to ensure the reliability of the results. Thus, data from the sensors of anti-lock braking systems, known as ABS systems, are correlated with the acceleration data for the angular location of the wheels. Impact sensors are also commonly used for the determination of tire footprint lengths.

These correlations are described, for example, in U.S. Pat. No. 6,112,587, and in patent application EP 2 090 862.

However, it appears that the data supplied by the WFC sensors may be seriously perturbed by various factors, in particular when the state of the road exhibits irregularities. In this case, the impacts caused in the wheels may unexpectedly initiate the transmission of data from the WFC sensors, and may completely or partially falsify the results. Thus the angular location of the wheels becomes random, or the length of the tire footprint is reduced.

In magnetic impact sensors added to WFC sensors, such as the sensor described in patent document EP 2 090 862 or the magnetometers proposed in patent FR 2 944 231, the magnetic field is modified when the sensor is in the angular portion of the wheel in contact with the ground, or when the rolling tire is flattened on the ground. The central unit then analyzes the variations of the magnetic field in order to calculate the footprint of the tire. Thus the presence of irregularities or variations in the road profile is not taken into consideration, and no tool is provided in this case to modulate the reliability of the measurements of the WFC sensors.

The invention therefore proposes to devise a tool for evaluating the reliability of the data supplied by multi-function WFC sensors of a vehicle for targeted applications, on the basis of the irregularities of the road. For this purpose, the invention proposes to use monitoring data obtained from the equipment of the vehicle for the purpose of adapting its handling, these data, if correctly identified, enabling the variations in the state of the road to be reflected directly or implicitly.

Direct monitoring equipment includes stereoscopic camera systems, radar systems and laser sensors, which directly supply information on the surface condition of the road.

Other equipment includes the suspension control systems of a vehicle, which implicitly supply data that can be used to characterize the monitoring of the state of the road. In these systems, sensors enable the shock absorbers to be adjusted so as to absorb the variations in the road surface. The U.S. Pat. No. 4,600,215 discloses sensors of this kind, in the form of ultrasonic sensors.

In vehicle suspension control solutions, such as those associated with hydropneumatic suspensions, a hydroelectronic unit with an integrated computer—known by the abbreviation BHI—receives data from a steering wheel angle sensor and body displacement sensors. The information on the angle and rotation speed of the steering wheel, together with the front and rear body heights, are processed by the BHI computer in order to regulate the suspension flow rate and pressure, as well as the height of the body. The present invention advantageously uses a BHI unit of this type to detect displacements of the vehicle body.

SUMMARY OF THE INVENTION

More precisely, the present invention proposes a method for estimating the reliability of measurements made periodically by multi-function sensors, known as WFC sensors, of tires of wheels of a vehicle traveling on a road, characterized in that it comprises, in succession:
- a step of extracting, from a system for monitoring the vehicle in a given environment for the purpose of adapting its behavior to this environment, periodic data on the vehicle body displacement heights at the position of each wheel, these data being known as wheel displacement data, indicating a state of the variations of the profile of the road on which the vehicle is traveling,
- a step of correlating these wheel displacement data with the values of at least one parameter sensitive to the variations of road profile for a given application, these values being deduced from the measurements made by the WFC sensors on each wheel at the same instants, and
- a step of taking into account the consistency between the displacement data and the values of the parameter correlated in the preceding step, by using decision criteria, with the aim of deducing a decision on the reliability of a given set of values of the parameter deduced from the measurements of the WFC sensors.

According to specific embodiments, the number of wheel displacement data is increased until a rate of global correlation between the wheel displacement data and the values of said parameter is at least equal to a given correlation threshold defining a reliability decision criterion;

the application is the location of the WFC sensors on the basis of the wheel position, and the parameter is the footprint length of the tires on the road, determined on the basis of an acceleration signal;

the correlation relates to the inverse variations between the wheel displacement data and the corresponding values of tire footprint length;

the wheel displacement data and/or the values of footprint length are selected on the basis of thresholds of detection of their variation;

the correlation relates to the simultaneous detection of noise in the wheel displacement data and in the corresponding values of tire footprint length;

radial acceleration being detected by the WFC sensor, the variations in footprint or the presence of noise are directly detected by the WFC sensor;

the wheel displacement data relate to the variations in the rolling average of the wheel displacement data;

the application relates to the location of the WFC sensors by association of the rotation data, deduced from the measurements of an angular detector of the WFC sensors, with the wheel revolution data counted by impulse sensors of an anti-lock braking system (ABS) or the equivalent, the average of the wheel displacement data being used to weight the validity of the angular offsets to be determined for the assignment of a WFC sensor to each of the wheels on the basis of the detection of the predetermined successive angular positions of the sensor of each wheel;

each angular position is modulated by the application of weighting coefficients varying as a function of the variations of the displacement data for each wheel relative to a reference displacement data element in the determination of the dispersion variance of the set of angular positions, for the purpose of deducing a reliability decision therefrom, taking into account the consistency between the value of each angular position and the state of the road;

the parameter is the measurement of the footprint length of a tire for an application for estimating the load on this tire by introducing weighting coefficients applied to the footprint length measurements and varying as a function of the displacement data for each wheel, in relation to the state of degradation of the road, for the purpose of deducing a reliability decision therefrom by elimination of the measurements corresponding to degraded conditions of the state of the road;

the parameter is the measurement of a footprint length characteristic of a tire, particularly the overshoot, for the purpose of estimating the wear on this tire by introducing weighting coefficients applied to the footprint length measurements and varying as a function of the displacement data for each wheel, in relation to the state of degradation of the road, for the purpose of deducing a reliability decision therefrom by elimination of the measurements corresponding to degraded conditions of the state of the road;

the application relates to the position of sensors and the parameter is a function for monitoring the detachment/breakaway of the sensor.

The invention also relates to a system for estimating the reliability of measurements which are made periodically by multi-function sensors, known as WFC sensors, of tires of wheels of a vehicle suitable for traveling on a road, and which are transmitted in the form of digital signals to a central processing unit. A system of this type for the application of the method defined above comprises equipment for monitoring the wheel displacement data for adapting it to the variations in the profile of the road on which it is traveling in order to maintain a stable body position by means of feedback control, the monitoring equipment being linked to the WFC sensors via the central processing unit which is capable of correlating data supplied by the WFC sensors and values of wheel displacement data supplied by the monitoring equipment for the purpose of weighting the values of at least one parameter obtained from the data delivered by the WFC sensors.

According to advantageous embodiments, the monitoring equipment is selected from among a suspension control system of the vehicle, which implicitly supplies state of the road monitoring data, and a system of stereoscopic cameras, at least one radar system, and a laser sensor which directly supply data on the road surface condition;

the suspension control system is a hydroelectronic unit with an integrated computer, known as a BHI, for controlling a hydropneumatic suspension, the BHI unit receiving data from a steering wheel angle sensor and from vehicle body displacement sensors, for the purpose of regulating the suspension flow rate and pressure and the body height;

if the application of the WFC sensors is the angular location of the wheels, the road state monitoring data supplied by the BHI unit of a hydropneumatic suspension control system are correlated with the acceleration data of the WFC sensors.

BRIEF DESCRIPTION OF THE DRAWINGS

Other data, characteristics and advantages of the present invention will become apparent in the light of the following non-limiting description, referring to the attached drawings, which show, respectively.

DETAILED DESCRIPTION OF THE INVENTION

In all the figures, the same reference symbols denote identical elements. Additionally, in order to improve the readability of the figures, the signals are shown in analog form, rather than in the sampled form which they have for the purpose of being digitally processed.

Figure 1:
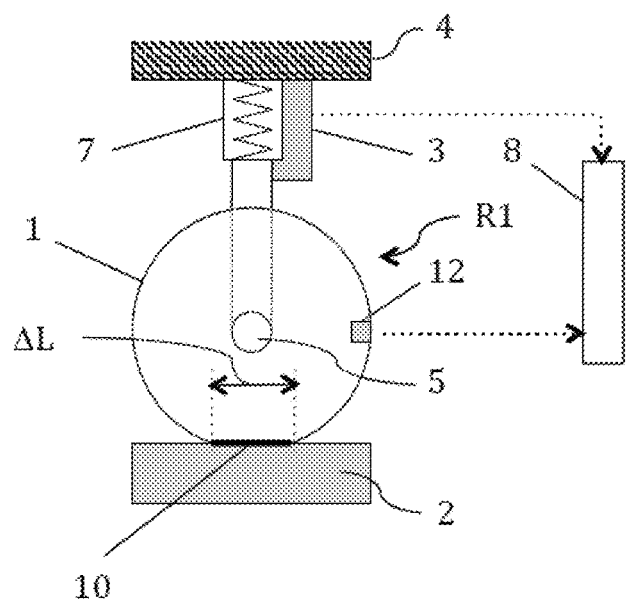
in FIG. 1, a diagram illustrating the environment of a tire of a vehicle traveling on a road with a body displacement sensor and a WFC sensor.

The schematic view of FIG. 1 shows each of the tires 1 of a vehicle traveling on a road 2, forming a footprint 10 with a length of $\Delta L$, together with the environment of this tire in the context of the invention. In this environment, a WFC sensor 12—in this case a TM sensor fixed to the inner face of the tire 1—is integrated into each wheel. A displacement sensor 3 for each wheel (only the wheel R1 is shown) can be used to measure an overall displacement of the vehicle body 4 mounted on each axle 5 via shock absorbers 7. The displacement sensors 3 are components of a suspension control system of the vehicle (not shown).

Each sensor 12 comprises pressure and temperature sensors, together with an accelerometer, a microprocessor and a radio frequency (abbreviated to RF) transmitter. A central unit 8 for the digital processing of the data is mounted on the vehicle and comprises a computer incorporating an RF receiver for receiving the signals sent by the RF transmitters. The assembly of the sensors 12, the central unit 8 and the communication means forms a TPMS system.

Additionally, the angular displacement of the body 4 is determined by a suspension computer which receives the information on the height of front and rear displacement of the body 4 supplied by the displacement sensors 3 of each wheel. The suspension computer acts on the shock absorbers 7 to adjust the body displacement. The displacement sensors 3 of these suspension control systems of the vehicle are thus used by the invention for characterizing the monitoring of the state of the road. Advantageously, the suspension computer—particularly a computer of a hydroelectronic module of the BHI type for a hydractive suspension—incorporates the computer of the central unit 8.

Figure 2:
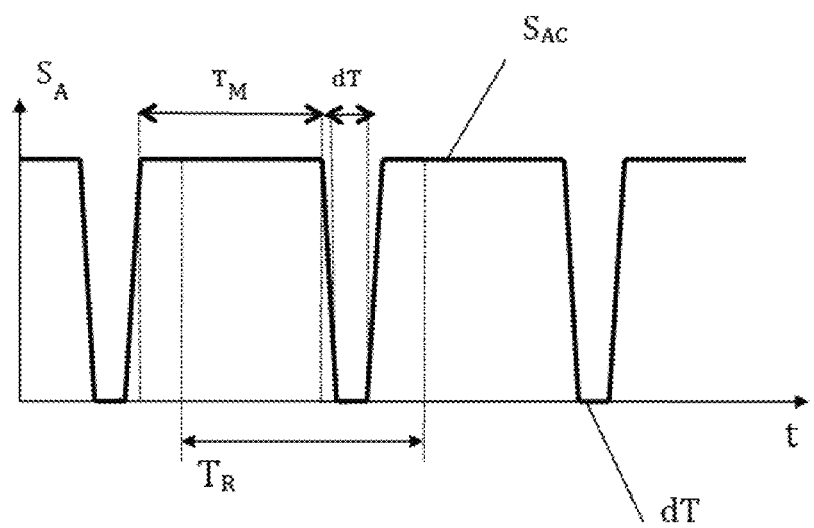
in FIG. 2, a diagram of the variation over time of a reference acceleration signal measured by the WFC sensor.

The diagram of FIG. 2 shows the variation of the acceleration signal $S_A$ transmitted by the accelerometer of a TM sensor 12 as a function of time "t", in ideal traveling conditions, that is to say on a flat road.

The signal $S_A$ is periodic, with a period $T_R$ corresponding to one revolution of the wheel. It is divided periodically between a constant value of centrifugal acceleration $S_{AC}$, for a reference duration $T_M$ in which the accelerometer sends a signal, and a zero (or quasi-zero) value during a reference time interval dT, such that $T_M+dT \approx T_R$. In the time interval dT, the accelerometer is positioned on the footprint 10, that is to say against the road 2 (FIG. 1). In this position, the sensor is immobile, and the radial (or centrifugal) acceleration is zero, such that the time interval dT in which the signal $S_A$ is zero corresponds to the length $\Delta L$ of the footprint.

If the vehicle travels on the road 2 in unstable conditions (a corner or a sudden change in speed), this causes a variation of the wheel displacement and, correlatively, a variation of the length of the footprint 10. This correlation is found between the signal $S_D$ of the displacement measurement sensor 3 (FIG. 1) and the acceleration signal $S_A$ characterizing the footprint length, as represented by the diagram of FIG. 3, showing variations of these signals in time t for a front wheel.

Figure 3:
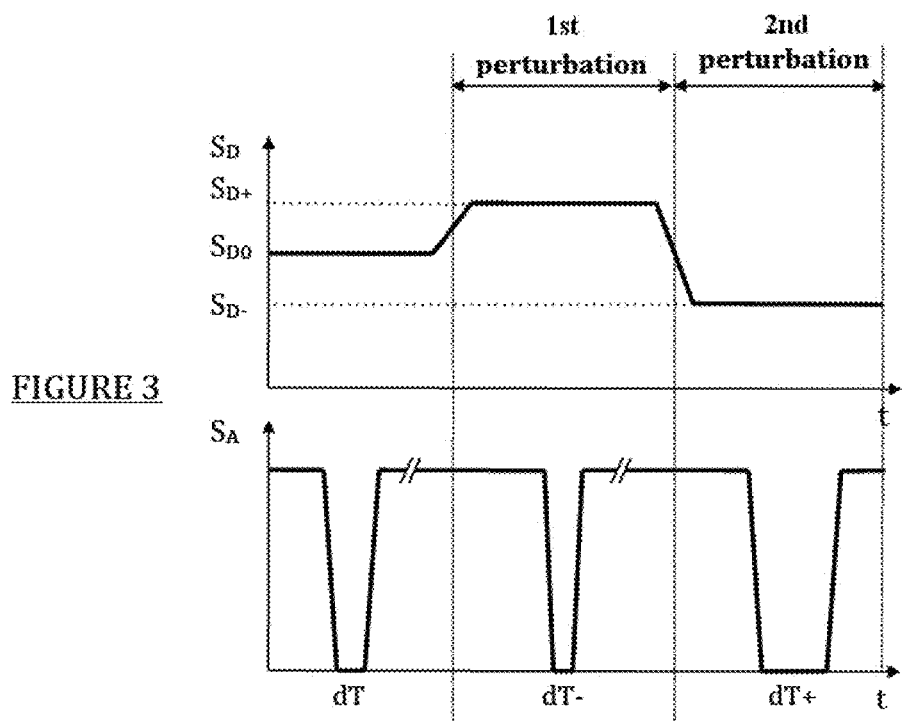
in FIG. 3, diagrams showing examples of correlation between the body displacement signal measured by the displacement sensor and the acceleration signal measured by the WFC sensor.

Thus a first perturbation shown in FIG. 3 causes an increase in the reference wheel displacement signal $S_{D0}$, manifested by an increased displacement signal $S_{D+}$. This perturbation, caused in internal cornering or during acceleration, then simultaneously results in a decrease of the duration of detection of the footprint 10 (FIG. 1). This decrease in the duration of the reference time interval dT corresponds to a time interval dT_ during which the signal $S_A$ is zero, and therefore to a decrease in the footprint length $\Delta L$. The variations are then said to be consistent.

To detect the variations in wheel displacement and footprint with sufficient precision, it is advantageous to provide filters to define detection thresholds of the corresponding signals.

Conversely, as also shown in FIG. 3, a second perturbation, caused by outside cornering or during braking, results in a decrease in wheel displacement. This decrease is manifested by a decreased displacement signal $S_{D-}$ and simultaneously results in an increased duration of detection of the footprint 10 (FIG. 1) dT+, and therefore an increase in the footprint length $\Delta L$.

Figure 4:
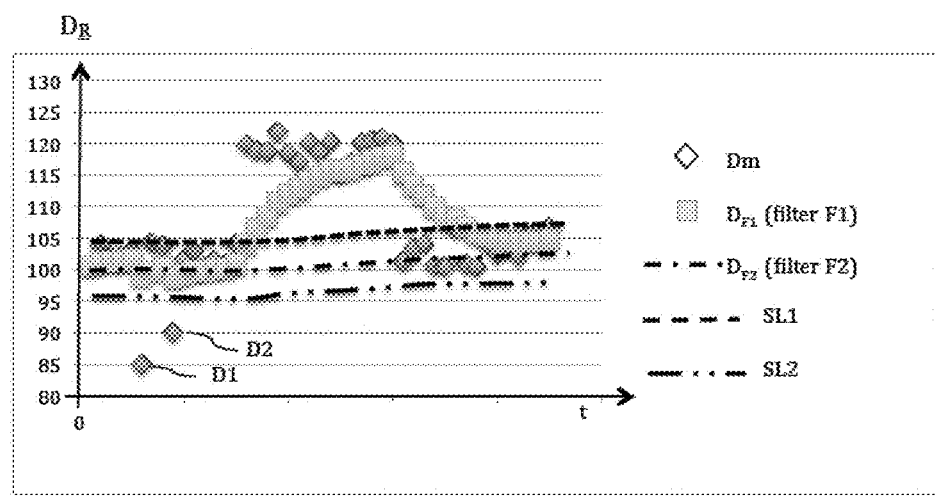
in FIG. 4, a diagram showing an increase of the displacement signal as a function of detection thresholds.

FIG. 4 shows an example of relevant detection of an increase in wheel displacement height $D_R$ (in mm) as a function of time t, using detection thresholds in a sequence of point measurements of displacement heights before and after filtering by two low-pass filters F1 and F2, denoted respectively as $D_m$, $D_{F1}$ and $D_{F2}$ on the graph of FIG. 4.

The filter F1 is a first-order low-pass filter in this example. It can be used to filter outliers D1 and D2 due to bumps in the road, while maintaining a signal dynamic range similar to that of the input signal, the filter having a short response time.

The filter F2 is also a first-order low-pass filter with a higher cut-off frequency than that of the filter F1. It can be used to filter the dynamic parts of the input signal, the filter having a long response time, to process thresholds of detection of increase or decrease.

Thus, in the example, the threshold of detection of an increase in the displacement, SL1, is set at 105% of the displacement filtered by the filter F2, and the threshold of detection of a decrease in the displacement, SL2, is set at 95% of the displacement filtered by the filter F2.

Figure 5:
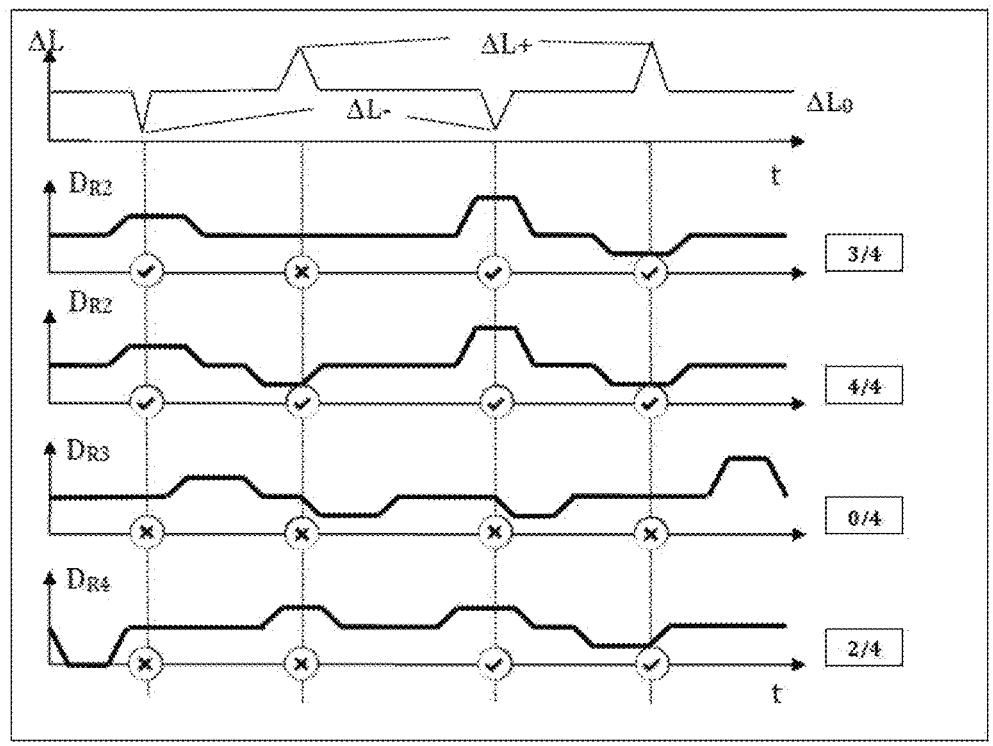
in FIG. 5, a diagram illustrating the application to the location of TM sensors by the correlation between the variations of wheel displacement data and those of the footprint length of the corresponding tires.

The diagram of FIG. 5 illustrates the application to the location of TM sensors, using these correlations between the variations of values of displacement heights $D_{R1}$ to $D_{R4}$ of the wheels $R_i$ (where i varies from 1 to 4) and those of the footprint length $\Delta L$ of the corresponding tires, as a function of time t.

The footprint length measurements defined as stable, showing no increase or decrease relative to a reference footprint $\Delta L_0$, are not taken into account. Only the footprint measurements representing an increase $\Delta L+$ or a decrease ΔL– in footprint length are counted in a footprint counter C_ΔL. These measurements are then compared with the variations in the displacement heights $D_{R1}$ to $D_{R4}$ of each of the wheels.

If the displacement heights $D_{R1}$ to $D_{R4}$ vary in a consistent manner relative to the footprint ΔL—that is to say, if the displacement $D_R$ decreases if, and only if, the footprint ΔL increases—the displacement is considered to be correlated. These consistent correlations are denoted by "✓" in the diagram of FIG. 5. Each of these consistent correlations increments by +1 a validity counter $C\_val_i$ dedicated to the corresponding wheel $R_i$.

In the contrary case, that is to say when the displacement $D_R$ and the footprint ΔL vary in the same direction, the displacement is not considered to be correlated. These inconsistent correlations, denoted by "x" in the diagram of FIG. 5, are not counted in the validity counter of the wheel in question.

Whether or not the correlations are consistent, each correlation of variations in footprint length ΔL and displacement height $D_R$ for each given wheel is counted in a message counter $C\_msg_i$ of the wheel $R_i$ in question.

Thus four validity rates are obtained, reflecting the correlation of the footprint with the displacements while determining the ratio of values between the validity counters and the message counters of each wheel: for the wheels R1 to R4, the validity rates in the example shown in the diagram of FIG. 5 are 3/4, 4/4, 0/4 and 2/4 respectively. The location of the TM sensor on wheel R2 therefore appears to be most likely. However, in order to increase the robustness of the location, it is preferable to count a large number of consistent and inconsistent correlations.

Decision criteria using validity rate thresholds for a sufficient number of footprint/displacement variations are then advantageously introduced. An iterative method of sensor location by correlation, incorporating these decision criteria, and executed by the computer of the central unit 8 (FIG. 1), is thus illustrated by the flow chart of FIG. 6 in its different steps.

In this flow chart, the measurements $M_{12}$ of pressure, temperature and acceleration for each tire, and the values $D_R$ of displacement height of each wheel (hereinafter also referred to as wheel displacement data) supplied by the TM sensors 12 and displacement sensors 3 (see FIG. 1), are periodically stored and dated for each wheel $R_i$ in the central unit, in the initial step of storage and dating step 100.

The central unit analyzes the data on the footprint length ΔL of a first wheel $R_i$ (step 110), on the basis of said data and values subsequently supplied in the initial step 100. A footprint stability test (test 120) returns to the initial step (step 100) if the footprint length ΔL is stable—and then moves on to the next footprint data element of the wheel concerned—or increments (+1) the message counter $C\_msg_i$ of this wheel if the footprint length ΔL varies (step 130).

The validity counter $C\_val_i$ and the message counter $C\_msg_i$ of the wheel $R_i$ in question can then be incremented in the decision loop 140. For this purpose, after the initialization of the loop 140 with i=1 (step 141), the variation of the footprint ΔL is analyzed as an increasing or decreasing data element, associated, respectively, with tests for the decrease (test 143) or increase (test 144) of displacement data $D_R$ measured at the same instants.

If the variations in footprint length ΔL and displacement data $D_R$ vary in the same direction (of increase or decrease for both parameters) for the wheel $R_i$, only the message counter $C\_msg_i$ is incremented (step 130). In the contrary case, where the footprint length ΔL and the displacement data element $D_R$ vary inversely, the validity counter $C\_val_i$ of the wheel $R_i$ (step 145) is also incremented.

A loop counter C_b is incremented (step 146) by the successive addition of +1 to the value of "i" until the value of 4 is reached (test 147). When the counters of all the wheels have been incremented by a set of stored and dated data (step 100), decision criteria are applied to the validity rates provided by the ratios between the incremented values of the validity counters $C\_val_i$ and the message counters $C\_msg_i$ (block 150).

For example, one set of criteria may be a sufficient number of messages, equal to at least ten in the example, a correlation rate above a correlation threshold $S_{sup}$ of 80% for one of the wheels (the located wheel), and a correlation rate $S_{inf}$ of 50% for the other wheels.

Until the decision criteria are satisfied, all the steps of the method are repeated, starting from the initial storage step 100. When the decision criteria are satisfied, the four wheels are located according to the criteria used. The algorithm for location by correlation of the footprint length ΔL and the displacement heights $D_R$ is then stopped (step 160).

According to a variant embodiment, an additional or alternative correlation may be introduced between detections of noise appearing in the measurements of a WFC sensor and in the wheel displacement data $D_R$.

Figure 7:
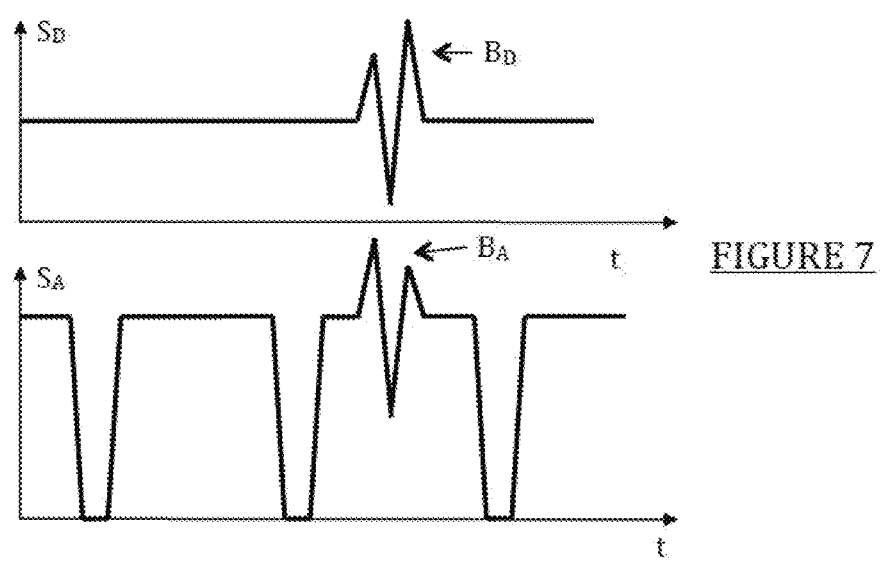
in FIG. 7, diagrams illustrating the noise content correlation between the wheel displacement signal of the displacement sensor and the acceleration signal of the WFC sensor where bumps are present on the road.

This is because the jolts caused by irregularities in the road generate noise which can be used for location detection. FIG. 7 shows the correlation of noise as a function of time t, and for the same wheel, for simultaneous perturbations $B_D$ and $B_A$ of the wheel displacement height $S_D$ and the acceleration signal $S_A$ respectively, in the same time interval $dt_B$, these signals being supplied, respectively, by the displacement sensor 3 (FIG. 1) and the WFC sensor of this wheel.

If the WFC sensor is a WU (wheel unit) sensor, the intervals dT in which the acceleration signal $S_A$ is zero, corresponding to the presence of the tire footprint on the road, are not detected. This is because, in this case, the WU sensor, mounted on the valve, is fixed to the rim instead of the tire. The acceleration signal $S_A$ then has a constant value of centrifugal acceleration $S_{AC}$, incorporating the segments shown in dotted lines in place of the falls in value during the time intervals dT.

The location method described above (with reference to FIG. 6) can then be adapted by using the correlation between the noises of the wheel displacement height signals $S_D$ and the acceleration signals $S_A$ caused by bumps in the road. This method is suitable for any WFC, WU or TM sensor, since it does not use the footprint detection reserved for TM sensors.

Figure 6:
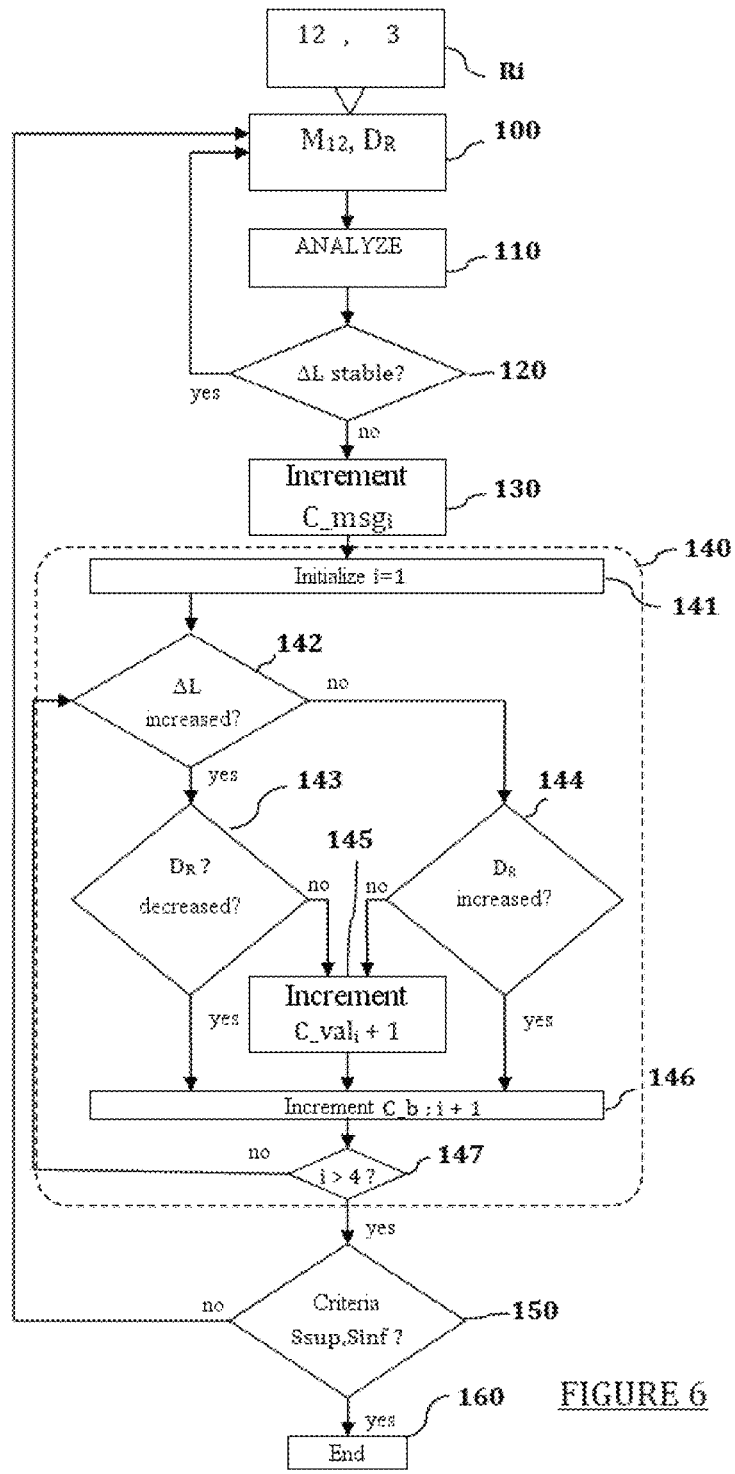
in FIG. 6, a flow chart of an iterative method for locating the wheels on the basis of the preceding correlations, incorporating decision criteria.
Figure 8:
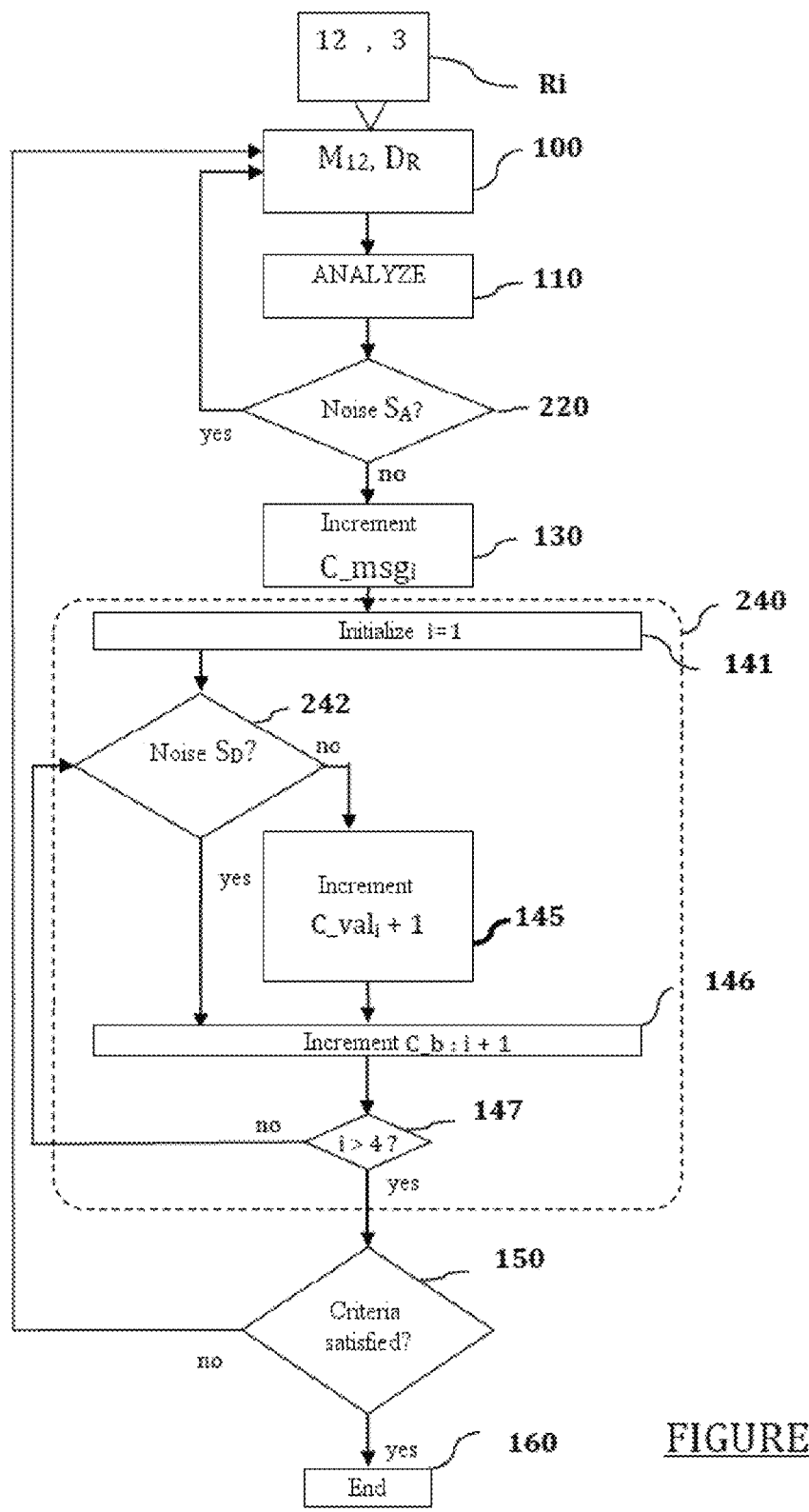
in FIG. 8, a flow chart of an iterative method for locating the wheels on the basis of correlations, incorporating the detection of noise caused by bumps on the road.

This adapted method is illustrated by the flow chart of FIG. 8, which is based on that of FIG. 6 but adapts it to the case of correlation by noise detection. Here, the incrementation of the message counter $C\_msg_i$ is dependent on a noise detection test on the acceleration signal $S_A$ obtained from the data of the WFC sensor (test 220, replacing test 120), and the incrementation loop 240 (replacing the loop 140) is based on the simultaneous detection of noise in the signal $S_D$ of the wheel displacement height $D_R$ (test 242) if noise has been detected in test 220, in which case the message counter $C\_msg_i$ has been incremented (step 130).

More precisely, in the incrementation loop 240, if noise is detected simultaneously in the acceleration signal $S_A$ (test 220) and in the wheel displacement height signal $S_D$ (test 242), the validity counter $C\_val_i$ is incremented (step 145).

If no noise is detected in the wheel displacement height signal $S_D$ (test 242), but noise is detected in the acceleration signal $S_A$ (test 220), the loop counter C_b is directly incremented. When the incrementation of the loop counter C_b reaches 4 (steps 146, 147), the decision criteria are applied (block 150) as in the flow chart of FIG. 6.

The location method may make use of the correlation of variation in acceleration and displacement signals, or the correlation of noise in these signals, separately or in combination, and, in particular, according to the type of WFC sensor used; a WFC sensor may or may not be compatible with footprint detection, depending on whether the position of the WFC sensor is on the rim (WU sensor) or on the inner face of the tire (TM sensor).

As a general rule, regardless of the type of sensor, the input of the data for application of the decision criteria (block 150) is formed by a P×N matrix of coefficients "0" and "1" of validity of the position of each of the "P" sensors on each of the "N" wheels of the vehicle. Conventionally, P=N=4, but it is also possible for P to be greater than N, that is to say for there to be more prospective sensors than there are wheel positions to be assigned. Decision algorithms can then be used, with the validity coefficients of the matrix as input data. Algorithms of this type are described, for example, in patent documents FR 2 974 033 and WO 2014/044355.

To save the battery life of the sensors, data transmission only takes place if the measurements (of displacement, acceleration, etc.) have been made in unstable conditions such that they are relevant, particularly when the vehicle speed varies (and therefore when the centrifugal acceleration varies), in cornering—where an accelerometer is required in the tangential axis—or when noise is detected.

If the sensor is fitted with a tangential accelerometer, these conditions can be met. The variations in the footprint or the presence of noise can then be detected directly by the sensor, and the step of analyzing the sensor data and the tests of footprint stability or noise detection can be omitted.

It is also advantageous to use the variations of the average of the displacement heights directly, in order to introduce a data element relating to the state of degradation of the road, for weighting or filtering the data obtained from the measurements of the WFC sensors.

Figure 9:
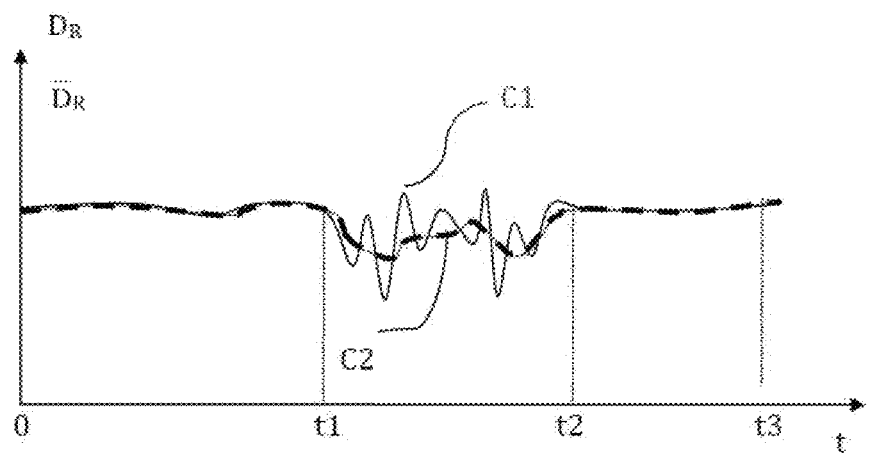
in FIG. 9, a diagram of the variations of the rolling average of the body displacement data over the set of wheels, reflecting the quality of the road.

This is because it appears, as shown by the graph as a function of time t in FIG. 9, that the rolling average $\overline{D}_R$, extended to the set of wheels (curve C1), of the displacement data $D_R$ for each wheel (curve C2) does indeed indicate the state of degradation of the road: when the vehicle travels on substantially flat portions of the road, in the time intervals from 0 to t1 and from t2 to t3, the curve C1 is substantially linear, but when the road is degraded in the time interval from t1 to t2, the curve C1 follows the degradation of this road.

The average $\overline{D}_R$ of the wheel displacement data $D_R$ thus indicates the state of the road and can therefore be used to weight the validity of angular offsets of the same sensor used in the assignment of a WFC sensor to each of the wheels. This assignment of location is executed by associating angular position data, deduced from the measurements of a detector of the rotation of the WFC sensors, for example a gravity-sensitive piezoelectric strip, with data on the wheel revolutions counted by impulse sensors fixed to the vehicle. As a general rule, revolution sensors fixed facing the wheels in anti-lock braking systems (ABS) may advantageously be used. A method of this type is described, for example, in the patent documents U.S. Pat. Nos. 5,808,190 and 6,112,587, incorporated herein by reference.

This method is based on the verification of a predetermined angular offset, measured, to the nearest whole number of revolutions, between the angular positions of a WFC sensor corresponding to the instants of sending of successive messages transmitted by the same WFC sensor with its identifier to the central unit. Each sending instant corresponds to an angular position of the sensor on its wheel, and the angular offset between two sending instants is known by the central unit, specifically for each wheel. This knowledge, based on the natural loss of synchronization of wheels revolving at different speeds (because of differences in the tire radius, trajectory, frictional coefficient or slip coefficient), can then be used to select the wheel corresponding to the transmissions made by the sensor, which is also recognized by its identifier.

To save the battery life, the WFC sensors are only activated during transmission windows covering the angular position of each sensor. With this arrangement, it must be possible to target this angle within a transmission angle providing sufficient precision.

Figure 10A:
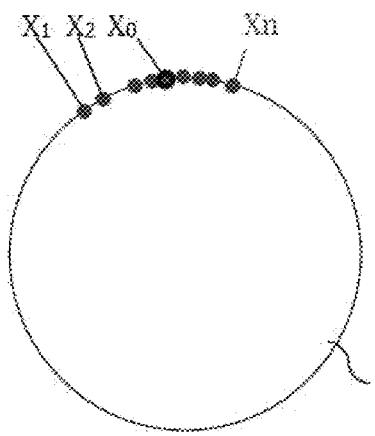
in FIGS. 10a and 10b, a diagram illustrating different angular positions of the location of a WFC sensor when these positions are grouped together sufficiently (FIG. 10a) or insufficiently (FIG. 10b), as a function of the degradation of the road, to enable a location assignment to be estimated.
Figure 10B:
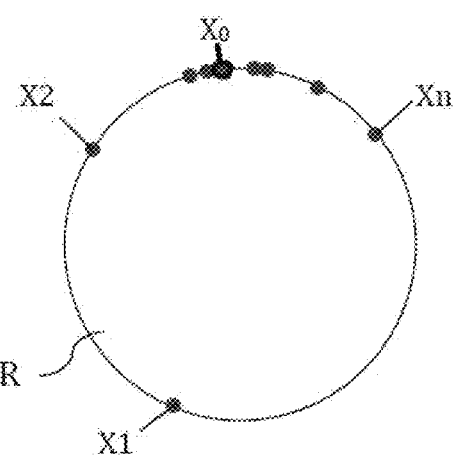

In practice, as illustrated by the angular positions X1, X2, . . . , Xn of FIGS. 10*a* and 10*b*, created on the periphery of a schematically represented wheel R, the positions X1, X2, . . . , Xn of a WFC sensor may be grouped in the transmission window $F_x$ centered on the targeted angular position $X_0$ (FIG. 10*a*) or may not be grouped in this way (FIG. 10*b*). In FIG. 10*a*, the grouping of the angular positions is sufficient to ensure that the sensor is indeed the sensor to be associated with the selected wheel. This matching is therefore guaranteed, as long as the road is sufficiently regular. However, if the road becomes degraded or bumpy (FIG. 10*b*), the angular positions X1, X2, . . . , Xn are dispersed well beyond the transmission window $F_x$, and the matching is no longer guaranteed, possibly resulting in errors of assignment.

According to the invention, the use of each angular position is modulated on the basis of the state of the road (irregularities, shocks, uniformity, etc.) by using a weighting coefficient which is a function of the displacement data $D_R$ of each wheel in the calculation of the variance V of a set of angular positions. This variance is characteristic of the dispersion of the angular positions in the assignment monitoring for each wheel.

Figure 11:
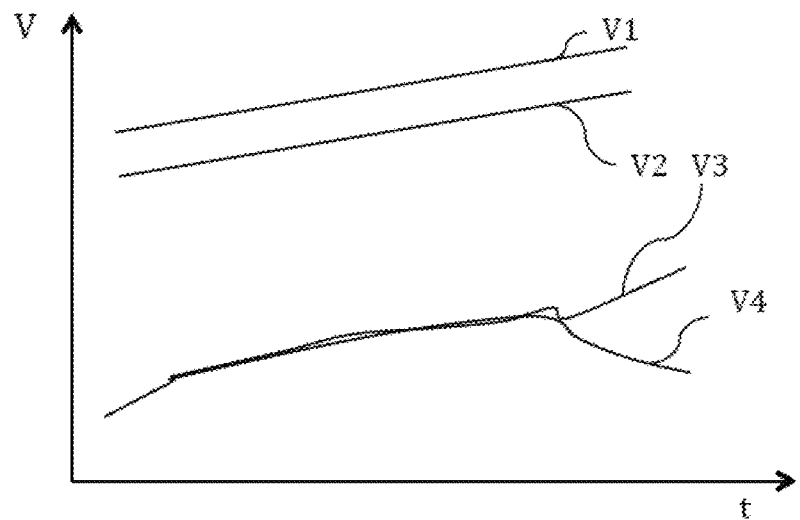
in FIG. 11, a graph of the variation of the variances of the angular positions of four wheels of a vehicle as a function of time, and in FIG. 12, a tire deformation signal for a new tire and for a worn tire, for the purpose of estimating the wear of the tire.

A study of the variations V1 to V4 of the four variances, where each variance must correspond to the location of a wheel (conventionally, the left front wheel, the right front wheel, the left rear wheel and the right rear wheel of a motor vehicle), as a function of time t—as illustrated by the graph of FIG. 11—can then be used to monitor the wheel assignment. In this case, the introduction of the weighting coefficients, indicating the reliability of each angular position, substantially improves the performance of this monitoring, particularly in terms of differentiating between very similar variances, such as the variances V3 and V4 in FIG. 11, over a long period. It is still possible for an assignment error to occur, particularly when the variations in variance appear to cross over.

More precisely, for each wheel R, the variance V of a set of angular positions Xj, where j varies from 1 to n, about an average $\overline{X}$ is expressed by the relation:

$$V = \frac{\sum_j (\overline{X} - X_j)^2}{n}, \text{ where } \overline{X} = \frac{\sum_j X_j}{n}$$

After the inclusion of the weighting coefficients αj, varying between 0 and 1 as a function of the variation of the wheel displacement height $D_R$ of the wheel R relative to a reference height, at the instants when the sensor data are transmitted to establish the angular positions, a weighted variance Vp is expressed by the relation:

$$Vp = \frac{\sum_j (\overline{X}p - \alpha_j X_j)^2}{\sum_j \alpha_j}, \text{ where } \overline{X_p} = \frac{\sum_j \alpha_j X_j}{\sum_j \alpha_j}$$

Each weighting coefficient αj indicates a state of degradation of the road, modulated between a flat road (αj=1) and a totally degraded road (αj=0). When the data from the displacement sensors are introduced in this way, the angular position data calculated from the measurements of the WFC sensors have a preponderant weight when the road is of good quality, that is to say when these data are compatible with the state of the road.

The invention is not limited to the exemplary embodiments described and represented herein.

The weighting of the data from the WFC sensors may also be used for the estimation of the load or wear of each tire.

This is because load estimation uses the precise measurement of the footprint length ΔL of the tire concerned. This estimation requires stable conditions, namely a road of good quality and a vehicle running at constant speed in a straight line.

By introducing weighting coefficients varying from 0 to 1 as described above in the measurement of the footprint length ΔL, it is possible to identify the relevant measurements on the basis of the displacement data $D_R$. The measurements made in unstable conditions are then rejected.

Figure 12:
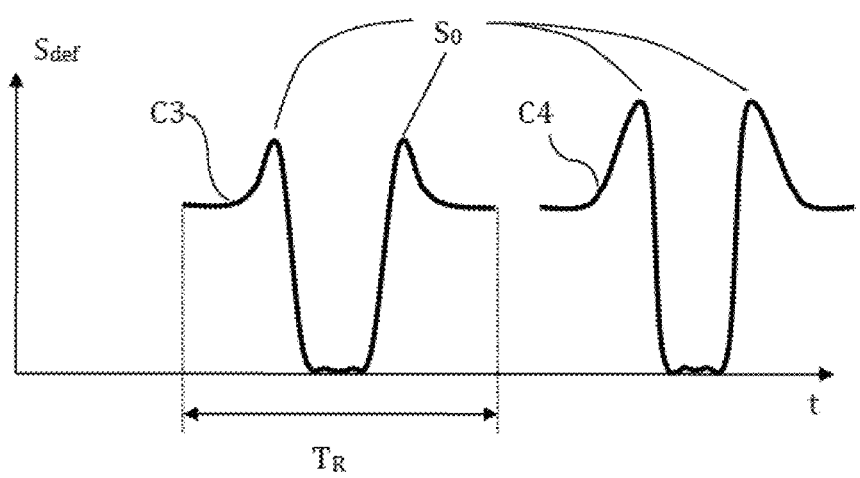

On the other hand, the estimation of the wear of a tire is illustrated in FIG. 12 by a comparison of a deformation signal $S_{def}$ of the tire, obtained, for example, from the acceleration signal $S_A$, over a period corresponding to one wheel revolution $T_R$, for a new tire (curve C3) and for a worn tire (curve C4) respectively. This estimation uses the measurement of certain precise characteristics of this signal $S_{def}$; thus the presence of "overshoots" $S_O$ (as they are known in the English terminology) reflects the deformation of the tire.

This wear estimation also requires stable conditions. Thus the analysis of the wheel displacement data $D_R$ and the introduction of the weighting coefficients makes it possible, as in the load estimation, to identify the relevant measurements; the measurements made in unstable conditions can then be rejected.

Another use of the wheel displacement data $D_R$ for characterizing the reliability of the measurements of TM sensors relates to the monitoring of the position of these sensors in the tires, because the detachment or breakaway of the TM sensor may damage the inside of the tire.

A monitoring function of this type, which detects when the sensor is no longer in its initial fitting position, is described in patent document DE10 2004 064 002, incorporated herein by reference. This function advantageously uses the correlation between the measurements of the TM sensor and the displacement height $D_R$ of the associated wheel.

The invention claimed is:

1. A method for estimating the reliability of measurements made periodically by multi-function Wheel Fitted Component (WFC) sensors of tires for wheels of a vehicle traveling on a road, the method comprising, in succession:
   a step of extracting, from a monitoring system configured to monitor the vehicle in a given environment for the purpose of adapting a behavior of the vehicle to the given environment, periodic wheel displacement data on vehicle body displacement heights at a position of each wheel, indicating a state of variations of a profile of the road on which the vehicle is traveling, the monitoring system being separate from the WFC sensors;
   a step of correlating the periodic wheel displacement data with values of at least one parameter sensitive to the variations in the profile of the road for an application of the WFC sensors to obtain a correlation, the parameter being a footprint length of the respective wheel, the values being deduced from the measurements made by the WFC sensors on each wheel at a same instant;
   a step of using decision criteria to deduce a decision on a reliability of a given set of values of the parameter that is the footprint length of the respective wheel deduced from measurements of the WFC sensors based on the correlation between the periodic wheel displacement data and the values of the parameter; and
   a step of performing one of (1) determining wheel location, (2) detecting one or more of overload and wear of the tires, (3) performing automatic training of the WFC sensors, and (4) monitoring positions of the WFC sensors using the given set of values of the parameter and the decision on the reliability of the given set of values.

2. The method as claimed in claim 1, wherein the monitoring system comprises displacement sensors separate from the wheels and configured to measure an overall displacement of the vehicle.

3. The method as claimed in claim 1, wherein the step of correlating comprises
   determining variations in at least two values of the periodic wheel displacement data,
   determining variations in at least two values of the at least one parameter, and
   determining a correlation of the periodic wheel displacement data with the values of the at least one parameter sensitive to the variations in the profile of the road for the application of the WFC sensors, based on the determined periodic wheel displacement data variations and the parameter variations.

4. A system for estimating the reliability of measurements made periodically by multi-function Wheel Fitted Component (WFC) sensors of tires for wheels of a vehicle capable of traveling on a road and transmitted in the form of digital signals to a central processing unit for the application of the method according to claim 1, the system comprising:
   the monitoring system configured to monitor the wheel displacement data for adapting the system to the variations in the profile of the road on which the vehicle is traveling in order to maintain a stable body position by feedback control, the monitoring system being linked to the WFC sensors via the central processing unit which is configured to correlate the data supplied by the WFC sensors and the values of the wheel displacement data supplied by the monitoring system to weight the values of the at least one parameter obtained from the measurements delivered by the WFC sensors to indicate the reliability of the measurements.

5. The system for estimating the reliability of measurements as claimed in claim 4, wherein the monitoring system is selected from among a suspension control system of the vehicle, which indirectly supplies monitoring data on the state of the road, and a system of stereoscopic cameras, at least one radar system, and a laser sensor which directly supply data on the surface state of the road.

\* \* \* \* \*